United States Patent
Sasaki et al.

(10) Patent No.: US 11,548,454 B2
(45) Date of Patent: Jan. 10, 2023

(54) DOOR HOLE SEAL

(71) Applicants: NISHIKAWA RUBBER CO., LTD., Hiroshima (JP); HONDA MOTOR CO., LTD., Tokyo (JP)

(72) Inventors: Naoya Sasaki, Hiroshima (JP); Hiromu Oda, Hiroshima (JP); Satoshi Endo, Tokyo (JP)

(73) Assignees: NISHIKAWA RUBBER CO., LTD., Hiroshima (JP); HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 17/167,467

(22) Filed: Feb. 4, 2021

(65) Prior Publication Data
US 2021/0245681 A1   Aug. 12, 2021

(30) Foreign Application Priority Data

Feb. 6, 2020 (JP) .............................. JP2020-018895
Feb. 2, 2021 (JP) .............................. JP2021-014954

(51) Int. Cl.
*B60R 13/08* (2006.01)
*F16J 15/06* (2006.01)
*B60R 16/02* (2006.01)

(52) U.S. Cl.
CPC ...... *B60R 13/0815* (2013.01); *B60R 16/0215* (2013.01); *F16J 15/06* (2013.01)

(58) Field of Classification Search
CPC ............ B60R 16/0207; B60R 16/0215; B60R 13/0243; B60R 13/0846
See application file for complete search history.

(56) References Cited

U.S. PATENT DOCUMENTS

| | | | | |
|---|---|---|---|---|
| 2,103,697 | A * | 12/1937 | Schlegel ................... | E06B 7/22 49/500.1 |
| 7,370,906 | B2 * | 5/2008 | Isobe ................... | B60R 16/0222 296/146.7 |
| 8,556,332 | B2 * | 10/2013 | Nakashima ............ | B60J 5/0416 296/146.7 |
| 2006/0012215 | A1 * | 1/2006 | Kohara ................... | B60H 1/249 296/146.1 |
| 2007/0220811 | A1 * | 9/2007 | Flendrig ................. | B60R 13/06 49/352 |
| 2017/0018916 | A1 * | 1/2017 | Itsuki ................... | B60R 16/0215 |

FOREIGN PATENT DOCUMENTS

| | | |
|---|---|---|
| JP | 01-73017 | 5/1989 |
| JP | 2002-274289 | 9/2002 |
| JP | 2009-51459 | 3/2009 |
| JP | 2018-39422 | 3/2018 |

* cited by examiner

*Primary Examiner* — Valerie L Woodward
(74) *Attorney, Agent, or Firm* — Casimir Jones, SC; Robert A. Goetz

(57) ABSTRACT

Noise caused by vibration of a door hole seal is reduced. A door hole seal includes a first sheet having a slit formed therein and a second sheet covering the slit from an exterior side of a vehicle. At least a specific region of the second sheet is made of a rubber-like elastic body, the specific region extending from a portion corresponding to the slit to a vertically lower end of the second sheet.

5 Claims, 5 Drawing Sheets

DOOR HOLE SEAL

This Nonprovisional application claims priority under 35 U.S.C. § 119 on Patent Application No. 2020-018895 filed in Japan on Feb. 6, 2020 and Patent Application No. 2021-014954 filed in Japan on Feb. 2, 2021, the entire contents of each of which are hereby incorporated by reference.

TECHNICAL FIELD

The present invention relates to a door hole seal.

BACKGROUND ART

A door hole seal is used to close a service hole formed in a door inner panel of a door of a vehicle. For example, Patent Literature 1 discloses a vehicle body structure in which a slit on a service hole cover for closing a service hole is covered by a sub sheet.

CITATION LIST

Patent Literature

[Patent Literature 1]
Japanese Patent Application Publication Tokukai No. 2009-51459

SUMMARY OF INVENTION

Technical Problem

However, with the conventional technology as described above, the sub sheet may vibrate due to an effect of, for example, a sound pressure from a speaker mounted in the vehicle. In such a case, the vibration of the sub sheet may lead to generation of noise.

It is an object of an aspect of the present invention to provide a door hole seal that enables a reduction in noise caused by vibration of the door hole seal.

Solution to Problem

In order to attain the object, a door hole seal in accordance with an aspect of the present invention is a door hole seal to be attached to a door inner panel of a door of a vehicle, including: a first sheet configured to close a service hole of the door inner panel, the first sheet having a slit through which a wire harness is inserted; and a second sheet covering the slit from an exterior side of the vehicle in such a manner that the wire harness is allowed to be inserted through the slit, at least a specific region of the second sheet being made of a rubber-like elastic body, the specific region extending from a first portion to a second portion of the second sheet, the first portion corresponding to the slit, the second portion being a vertically lower end.

Advantageous Effects of Invention

According to an aspect of the present invention, it is possible to provide a door hole seal that enables a reduction in noise caused by vibration of the door hole seal.

DESCRIPTION OF EMBODIMENTS

Embodiment 1

The following description will discuss an embodiment of the present invention in detail.

<Example of Attachment of Door Hole Seal>

Figure 1:
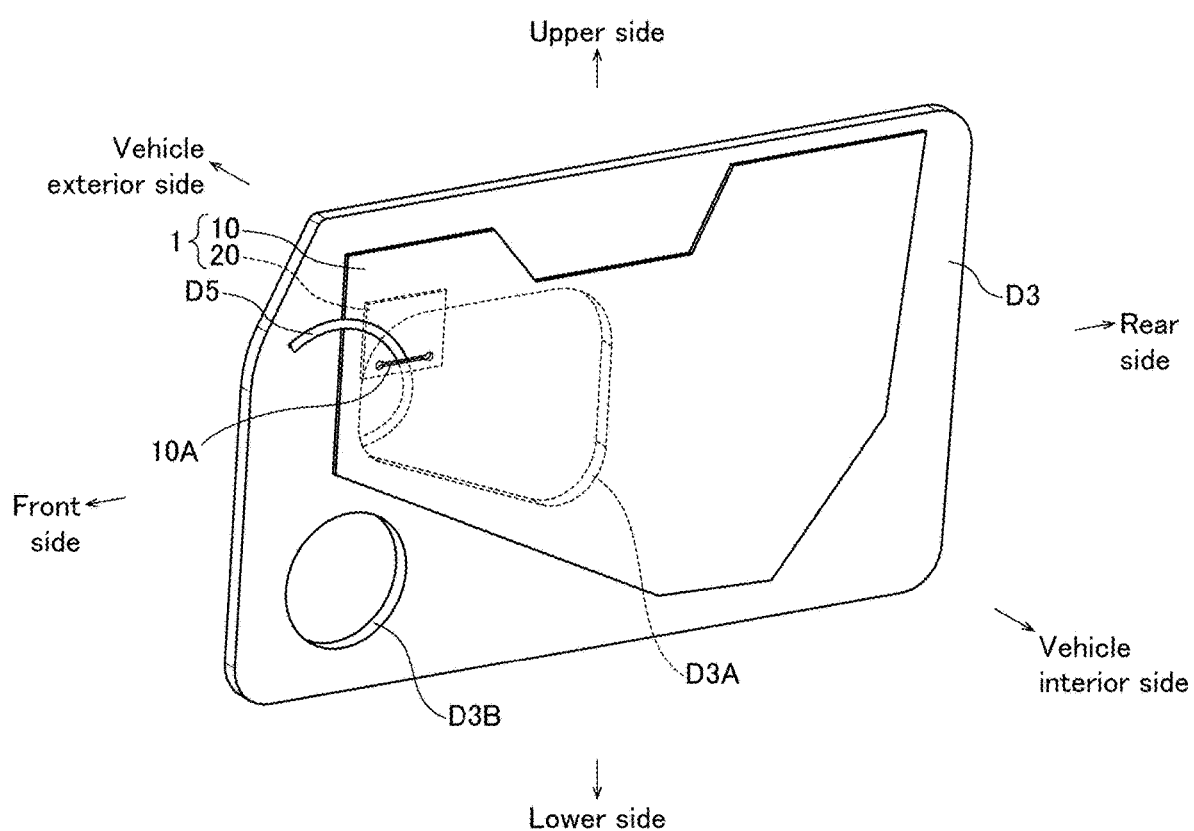
FIG. 1 is a view illustrating a structure of a vehicle interior side portion of a door inner panel having a door hole seal in accordance with Embodiment 1 of the present invention attached thereto.

First, with reference to FIG. 1, the following description will discuss a door inner panel D3 of a door of a vehicle, the door inner panel D3 having a door hole seal 1 in accordance with an embodiment of the present invention attached thereto. In an example illustrated in FIG. 1, an upper side, a lower side, a left-hand side, a right-hand side, a front side, and a back side of a drawing sheet of FIG. 1 correspond to a vertically upper side, a vertically lower side, a front side, a rear side, a vehicle interior side (an interior side of the vehicle) of the vehicle, and a vehicle exterior side (an exterior side of the vehicle) of the vehicle, respectively.

As illustrated in FIG. 1, the door, which is openably and closably provided in a door opening of the vehicle, includes a door outer panel (not illustrated) and the door inner panel D3. The door inner panel D3 has a service hole D3A into which a repair worker can insert a hand, a tool, and others, for example, for repair of parts inside the door. In the example illustrated in FIG. 1, the service hole D3A is provided in a front portion of the door inner panel D3.

The door inner panel D3 also has a speaker opening D3B through which sound emitted from a speaker inside the door (not illustrated) passes. In the example illustrated in FIG. 1, the speaker opening D3B is provided at a position that is in a front lower portion of the door inner panel D3 and below the service hole D3A. The closer to the speaker opening D3B a member is located, the more the member is affected by a sound pressure of the speaker, and the more prone the member is to vibrate, accordingly.

The door inner panel D3 has the door hole seal 1 attached thereto. The door hole seal 1 closes the service hole D3A and the like, which are provided in the door inner panel D3, from the vehicle interior side, thereby preventing rainwater or the like having entered in between a door glass (not illustrated) and the door outer panel from eventually entering the interior of the vehicle through the service hole D3A.

The door hole seal 1 has formed therein a slit 10A through which a wire harness D5 is inserted. The wire harness D5, also referred to as a cable, is capable of supplying electricity to devices inside the door, such as the speaker and a window regulator. Alternatively, the wire harness D5 may be one that does not supply electricity, and may be one that, for example, transmits a physical force between the inside and the outside of the door.

Note that the above-described attachment of the door hole seal 1 is only an example. Alternatively, the service hole D3A closed by the door hole seal 1 may be provided in a rear portion of the door inner panel D3. Further, the door hole seal 1 in accordance with an embodiment of the present invention can be attached to any type of vehicle doors. Accordingly, the door hole seal 1 can be attached, for example, to a front door (not illustrated) or a rear door (not illustrated). Further, the door hole seal 1 in accordance with an embodiment of the present invention can be attached to any type of automobiles such as a hardtop and a convertible.

<Structure of Door Hole Seal 1>

Figure 2:
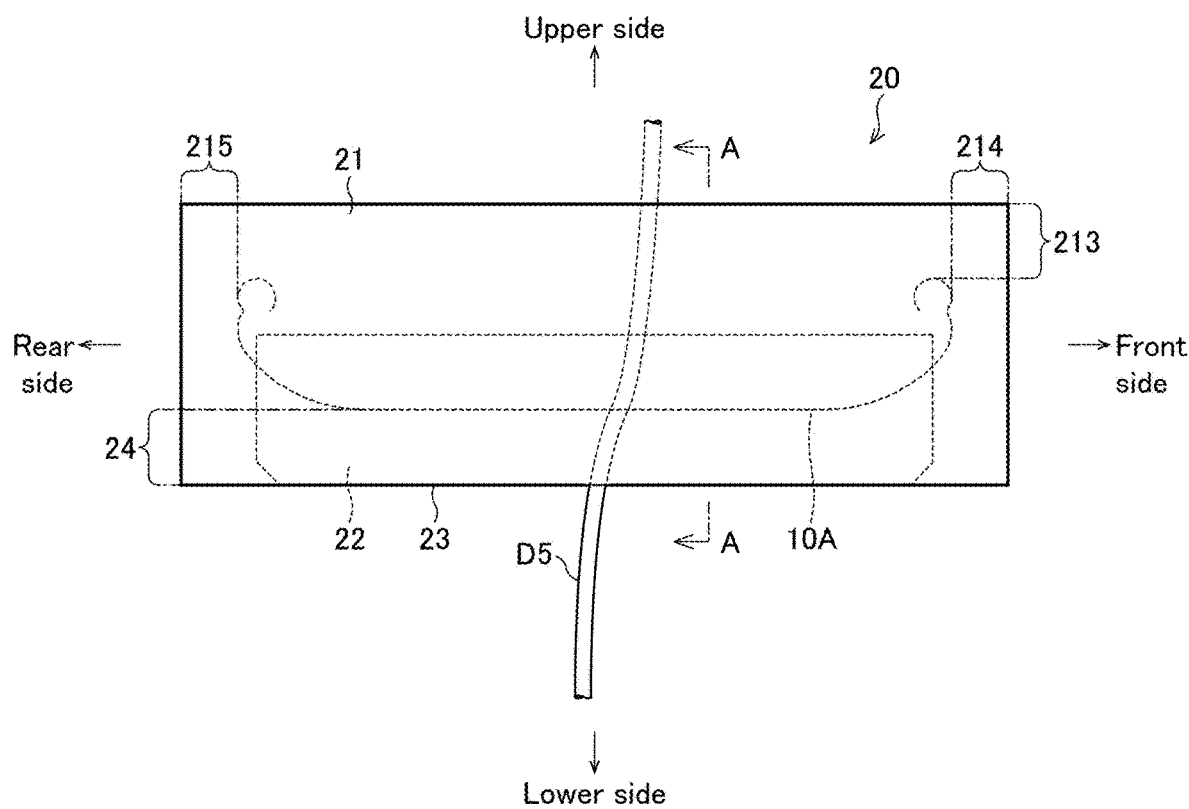
FIG. 2 is a view schematically illustrating a structure of a vehicle exterior side portion of the door hole seal illustrated in FIG. 1.
Figure 3:
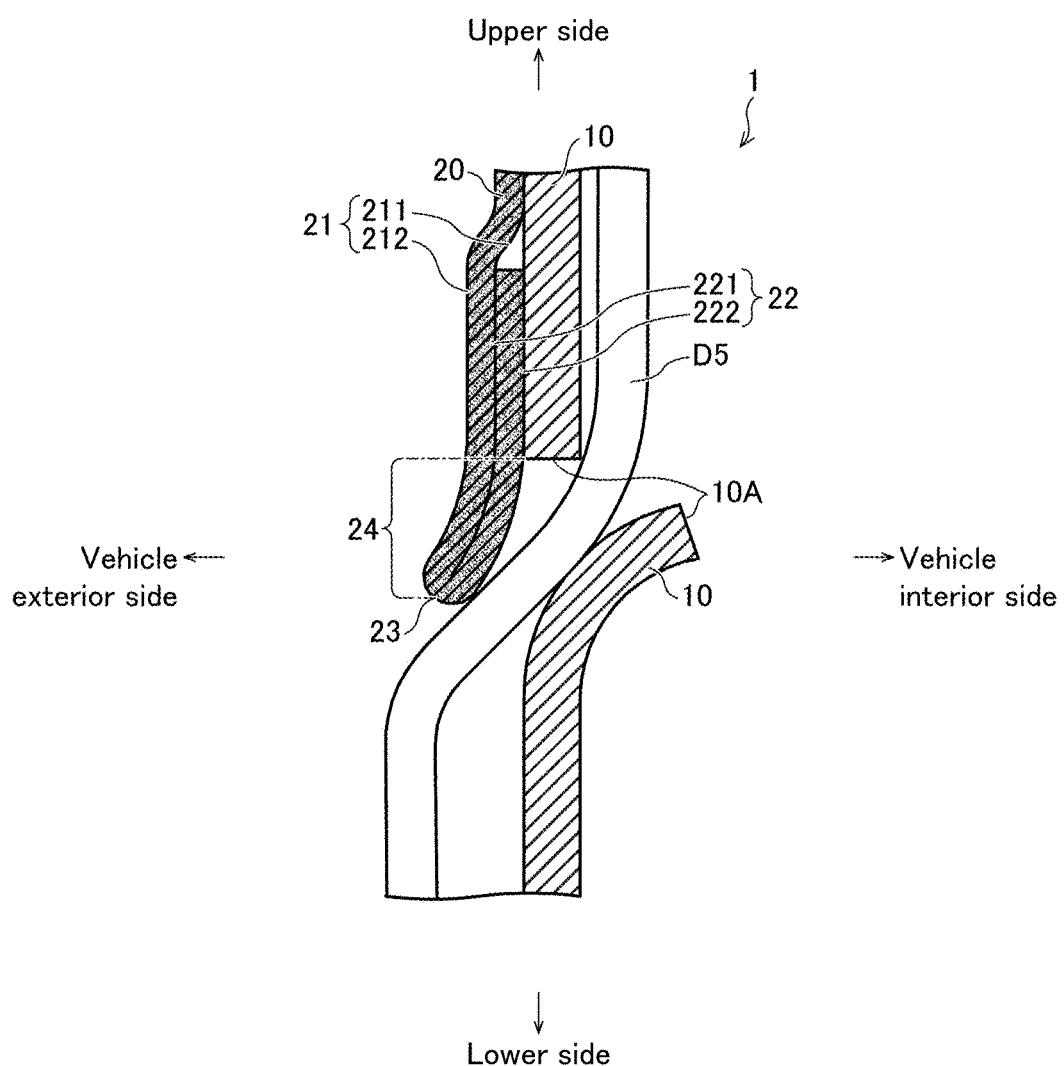
FIG. 3 is a cross-sectional view of the door hole seal illustrated in FIG. 2, the view being taken along a line A-A in FIG. 2.

Next, the following description will discuss a structure of the door hole seal 1 with reference to FIGS. 1 through 3. The door hole seal 1 includes a first sheet 10 and a second sheet 20. In an example illustrated in FIG. 2, a right-hand side and a left-hand side of a drawing sheet of FIG. 2 correspond to a front side and a rear side, respectively. In an example illustrated in FIG. 3, a left-hand side and a right-hand side of a drawing sheet of FIG. 3 correspond to a vehicle exterior side and a vehicle interior side, respectively.

As illustrated in FIG. 1, the first sheet 10 is attached to the door inner panel D3 so as to close the service hole D3A. The first sheet 10 has formed therein the slit 10A through which the wire harness D5 is inserted. In the example illustrated in FIG. 1, the slit 10A is provided in a front upper portion of the first sheet 10 so as to extend in a front-rear direction.

Examples of a material of the first sheet 10 include an elastomer, a resin, and a composite of these materials. Examples of the elastomer include rubber and a thermoplastic elastomer (TPE). Examples of the rubber include ethylene-propylene-diene rubber (EPDM) and urethane rubber, and examples of the TPE include a thermoplastic olefinic elastomer (TPO). The TPO is a composite obtained by mixing a TPE serving as a soft segment and a resin serving as a hard segment such as PE (polyethylene) or PP (polypropylene).

Examples of the resin included in the first sheet 10 include PE (polyethylene), PP (polypropylene), PVA (polyvinyl alcohol), and ABS (acrylonitrile-butadiene-styrene). Further, the material of the first sheet 10 may be used in the form of a foamed product or a fiber aggregate.

The second sheet 20 covers the slit 10A from the vehicle exterior side. As illustrated in FIGS. 2 and 3, the second sheet 20 includes a main body part 21 and a turnback part 22. The main body part 21 and the turnback part 22 are continuous with each other at a lower end (a vertically lower end) 23 of the second sheet 20. In other words, the second sheet 20 is folded back at the lower end 23.

In Embodiment 1, a whole of the second sheet 20 is made of a rubber-like elastic body described later. However, the present invention is not limited to thereto, provided that at least a specific region 24 of the second sheet 20 is made of the rubber-like elastic body, the specific region 24 extending from a portion corresponding to the slit 10A to the lower end 23. Note that in terms of ease in production of the second sheet 20, it is preferable that the whole of the second sheet 20, rather than only the specific region 24, be made of the rubber-like elastic body.

A main body-side adhesive part 211 is provided on a vehicle interior-side surface (one surface) of the main body part 21, and a main body-side non-adhesive part 212 is provided on a vehicle exterior-side surface of the main body part 21. A turnback-side adhesive part 221 is provided on a vehicle exterior-side surface of the turnback part 22, and a turnback-side non-adhesive part 222 is provided on a vehicle interior-side surface of the turnback part 22. The main body-side adhesive part 211 and the turnback-side adhesive part 221 are bonded to each other. Note that, in this specification, "bonding/adhesive" encompasses the concept of "sticking."

As illustrated in FIG. 2, a length of the main body part 21 in a vertical direction and a length of the main body part 21 in the front-rear direction are longer than those of the turnback part 22, respectively. The turnback part 22 is bonded to a lower portion of the main body part 21 in the vicinity of a center of the main body part 21 in the front-rear direction.

The main body part 21 includes an upper portion 213, a front portion (side portion) 214, and a rear portion (side portion) 215. The upper portion 213 is located above the slit 10A. The front portion 214 is located closer to the front side than the slit 10A and is continuous from the upper portion 213 to the lower end 23. The rear portion 215 is located closer to the rear side than the slit 10A and is continuous from the upper portion 213 to the lower end 23.

The turnback part 22 is bonded to none of the upper portion 213, the front portion 214, and the rear portion 215. Accordingly, the second sheet 20 is bonded to the first sheet 10 by a portion of the main body-side adhesive part 211 which portion is provided in at least the upper portion 213, the front portion 214, and the rear portion 215. Note that the present invention is not limited thereto, and the second sheet 20 may be bonded to the first sheet 10 by a portion of the main body-side adhesive part 211 which portion is provided in (i) the upper portion 213 and (ii) at least one of the front portion 214 and the rear portion 215.

In Embodiment 1, an upper end of the turnback part 22 is located above at least a portion of the slit 10A. Further, a front end of the turnback part 22 is located closer to the rear side than a front portion of the slit 10A, and a rear end of the turnback part 22 is located closer to the front side than a rear portion of the slit 10A. Accordingly, at least a portion of the specific region 24 of the second sheet 20 is folded back such that (i) the main body-side adhesive part 211 and the turnback-side adhesive part 221 are on an inner side and (ii) the main body-side adhesive part 211 and the turnback-side adhesive part 221 are bonded to each other. The second sheet 20 is folded back from the lower side toward the portion corresponding to the slit 10A.

The second sheet 20 is bonded to the first sheet 10 such that the turnback-side non-adhesive part 222 faces the slit 10A. As such, the second sheet 20 is bonded to the first sheet 10 so as not to close the slit 10A. In other words, the second sheet 20 covers the slit 10A from the vehicle exterior side in such a manner that the wire harness D5 can be inserted through the slit 10A.

The second sheet 20 is arranged such that the specific region 24, which extends from the portion corresponding to the slit 10A to the lower end 23, is made of the rubber-like elastic body. Examples of the rubber-like elastic body include an elastomer and an elastomer-containing composite. Examples of the elastomer include rubber such as EPDM and urethane rubber, and TPE. Examples of the TPE include TPO.

Further, the rubber-like elastic body of which the specific region 24 of the second sheet 20 is made is preferably a foamed product, and more preferably a rubber-like elastic body obtained by foaming an elastomer or an elastomer-containing composite. In such a case, the second sheet is even less prone to vibrate. This allows for further reduction of noise caused by vibration of the second sheet.

<Method for Producing Door Hole Seal>

Figure 4:
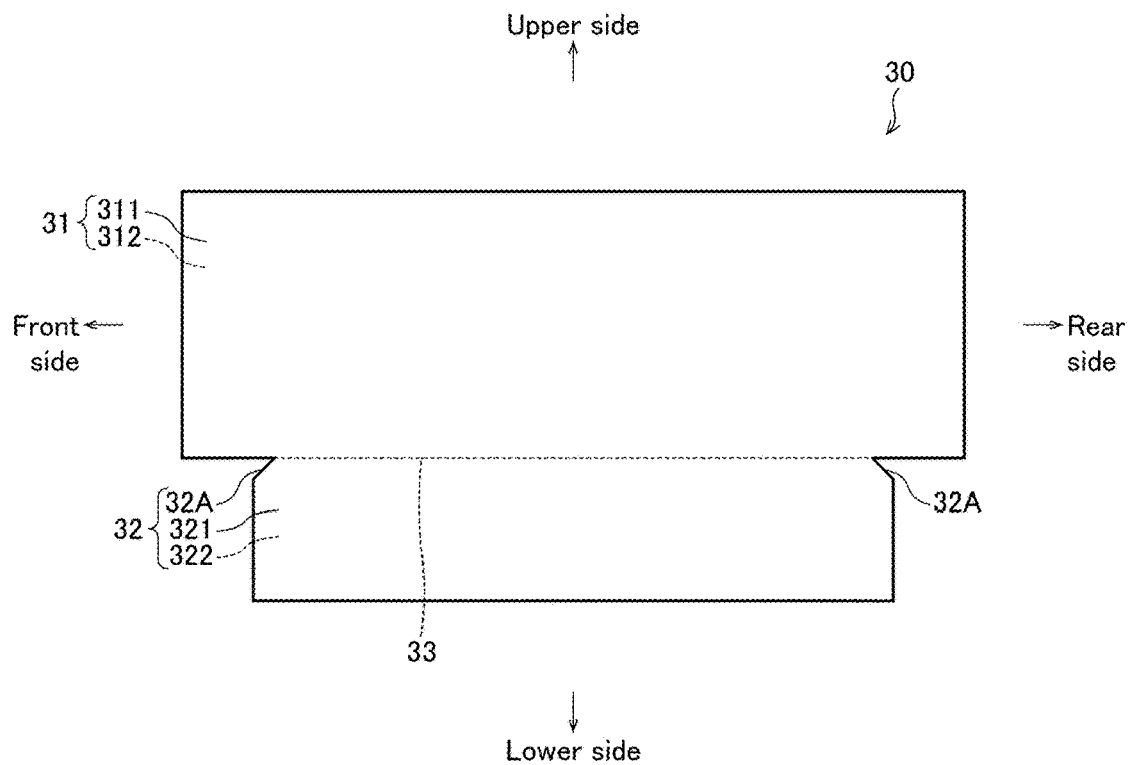
FIG. 4 is a view schematically illustrating a second sheet material for producing a second sheet illustrated in FIG. 2.

As illustrated in FIG. 4, the second sheet 20 constituting the door hole seal 1 is produced from a second sheet material 30. The second sheet material 30 includes a main body part 31 and a turnback part 32. In an example illustrated in FIG. 4, assuming a state in which the main body part 31 is attached to the door inner panel D3 (illustrated in FIG. 1), an upper side, a lower side, a left-hand side, and a right-hand side of a drawing sheet of FIG. 4 correspond to a vertically upper side, a vertically lower side, a front side, and a rear side, respectively.

The main body part 31 and the turnback part 32 are continuous with each other. A boundary between the main body part 31 and the turnback part 32 is referred to as a turnback line 33. The main body part 31, the turnback part 32, and the turnback line 33 of the second sheet material 30 correspond to the main body part 21, the turnback part 22, and the lower end 23 of the second sheet 20, respectively. In order to effectively reduce noise caused by vibration of the second sheet 20, a thickness of the second sheet material 30 is preferably not less than 1 mm, more preferably not less than 2 mm, and still more preferably not less than 3 mm.

On respective surfaces (one surface) of the main body part 31 and the turnback part 32 which surfaces are on a front side of the drawing sheet of FIG. 4, a main body-side adhesive part 311 and a turnback-side adhesive part 321 are provided, respectively. On respective surfaces of the main body part 31 and the turnback part 32 which surfaces are on a back side of the drawing sheet of FIG. 4, a main body-side non-adhesive part 312 and a turnback-side non-adhesive part 322 are provided, respectively.

The turnback part 32 has a notch 32A at a portion connected to the turnback line 33, the notch 32A being cut out from the front side and from the rear side, respectively. The notch 32A functions as a mark according to which the second sheet material 30 is folded back along the turnback line 33. As such, a worker can fold back the second sheet material 30 along the turnback line 33 easily and accurately.

In production of the door hole seal 1, first, the turnback part 32 of the second sheet material 30 is turned back from the lower side toward the upper side along the turnback line 33, and the main body-side adhesive part 311 and the turnback-side adhesive part 321 are bonded to each other to produce the second sheet 20. Then, the second sheet 20 is bonded to the first sheet 10 such that the turnback-side non-adhesive part 222 of the second sheet 20 faces the slit 10A. In this manner, the door hole seal 1 is produced.

<Effects>

With the above configuration, at least the specific region of the second sheet 20 is made of the rubber-like elastic body, the specific region extending from the portion corresponding to the slit 10A to the lower end 23. Accordingly, in comparison with a case where the second sheet is made of a material other than the rubber-like elastic body, the second sheet 20 is less prone to vibrate. This allows for reduction of noise caused by vibration of the second sheet 20.

Further, in a case where the rubber-like elastic body constituting at least a portion of the second sheet 20 is a foamed product, the second sheet 20 is even less prone to vibrate. This allows for further reduction of noise caused by vibration of the second sheet 20. Further, in a case where the rubber-like elastic body is a thermoplastic elastomer, in particular, ethylene-propylene-diene rubber, the second sheet 20 is even less prone to vibrate. This allows for further reduction of noise caused by vibration of the second sheet 20.

In a case where the slit 10A is located in the vicinity of the speaker opening D3B, and the second sheet 20 covering the slit 10A is therefore significantly affected by a sound pressure of the speaker (not illustrated), the second sheet 20 is more prone to vibrate. However, even in such a case, the above configuration in which the specific region 24 of the second sheet 20 is made of the rubber-like elastic body enables vibration of the second sheet 20 to be reduced effectively. This allows for effective reduction of noise caused by vibration of the second sheet 20.

Further, the second sheet 20 is bonded to the first sheet 10 by a portion of the main body-side adhesive part 211 which portion is provided in (i) the upper portion 213 and (ii) at least one of the front portion 214 and the rear portion 215. This makes it possible to effectively prevent rainwater or the like from entering the interior side of the vehicle through the slit 10A from above or from a side of the slit 10A.

Further, at least a portion of the specific region 24 of the second sheet 20 is folded back such that (i) the main body-side adhesive part 211 and the turnback-side adhesive part 221 are on an inner side and (ii) the main body-side adhesive part 211 and the turnback-side adhesive part 221 are bonded to each other. As such, a complicated process need not be carried out in order to allow the wire harness D5 to be inserted. Specifically, for example, it is neither necessary to provide an adhesive part only in a portion of the second sheet 20 other than the specific region 24, nor is it necessary to reduce the adhesiveness of the specific region 24 of the second sheet 20 by aligning the specific region 24 with another member and bonding the specific region 24 and the another member to each other. This makes it possible to easily produce the door hole seal 1.

Further, the second sheet 20 is folded back from the lower side toward the portion corresponding to the slit 10A. Accordingly, the wire harness D5 inserted through the slit 10A is covered by the second sheet 20 in an area closer to the vehicle exterior side than the first sheet 10. This makes it possible to effectively prevent rainwater or the like from entering through the slit 10A from the vehicle exterior side.

<Variation>

In Embodiment 1, the second sheet 20 is bonded to the first sheet 10. However, the present invention is not limited thereto, and the second sheet may be welded to the first sheet 10. For example, the second sheet may be ultrasonically welded to the first sheet 10.

In Embodiment 1, the second sheet 20 is produced by folding back the turnback part 32 of the second sheet material 30 and bonding the turnback part 32 to the main body part 31. However, the present invention is not limited thereto, provided that the second sheet 20 is able to cover the slit 10A from the vehicle exterior side in such a manner that the wire harness D5 can be inserted through the slit 10A. For example, an adhesive part may be provided only in a portion of the second sheet 20 other than the specific region 24. Alternatively, the adhesiveness of the specific region 24 of the second sheet 20 may be reduced by bonding a member different from the second sheet 20 to the specific region 24 of the second sheet 20.

Figure 5:
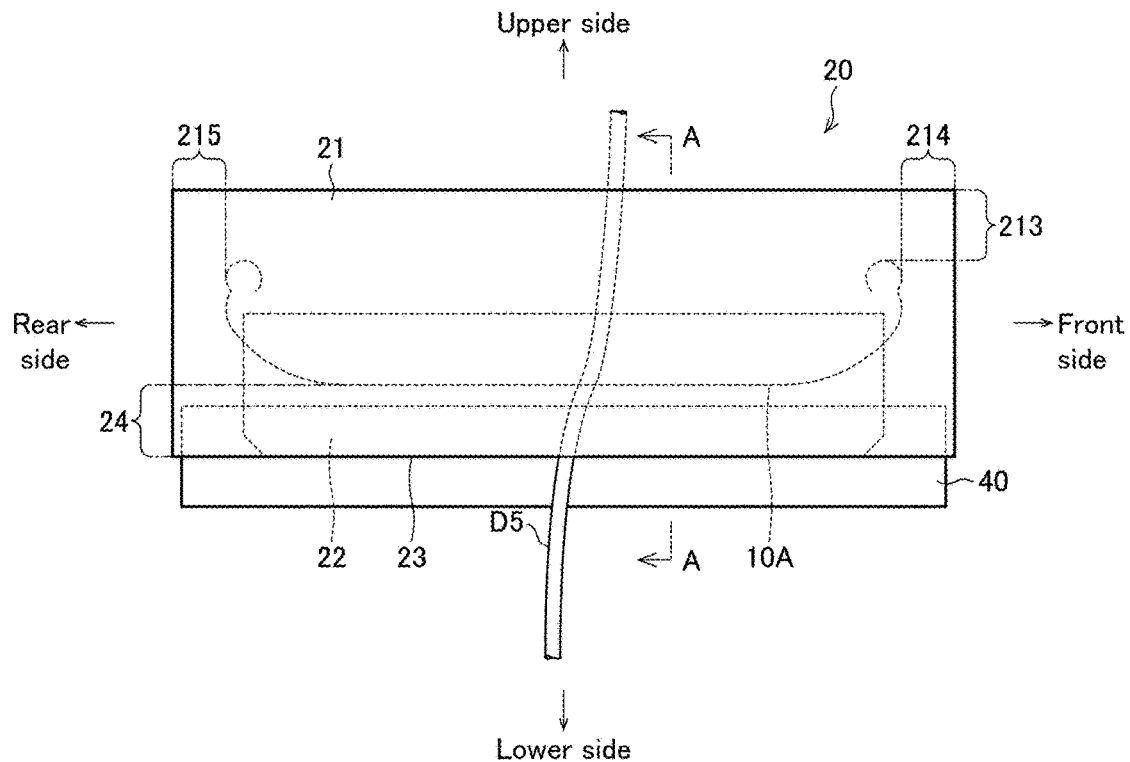
FIG. 5 is a view schematically illustrating a structure of a vehicle exterior side portion of a modified example of the door hole seal illustrated in FIG. 2.
Figure 6:
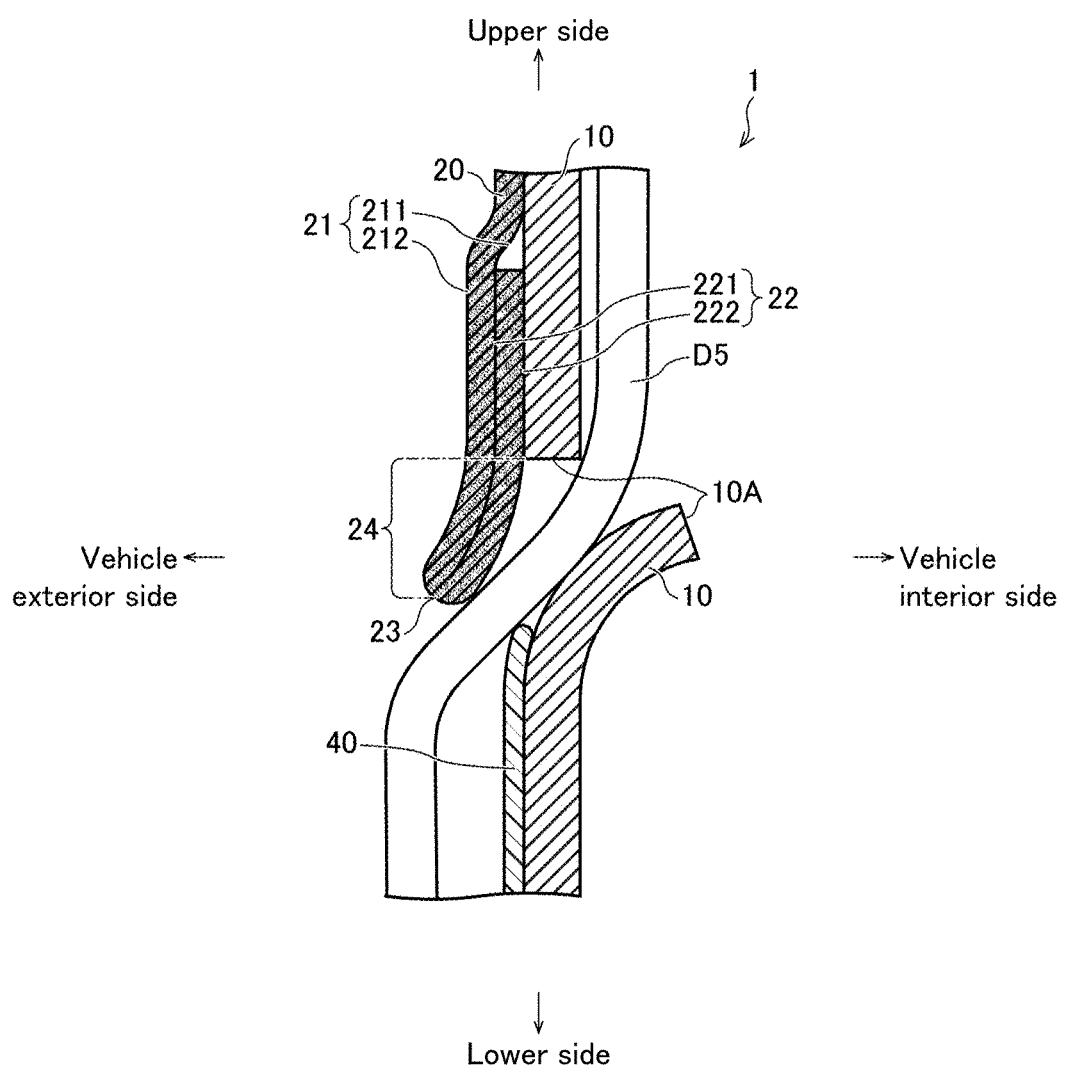
FIG. 6 is a cross-sectional view of the door hole seal illustrated in FIG. 5, the view being taken along a line A-A in FIG. 5.

Note that as illustrated in FIGS. 5 and 6, a third sheet 40 for reinforcing a portion around the slit 10A may be bonded or welded to the first sheet 10. In the configuration illustrated in FIG. 5, the third sheet 40 is located below the slit 10A so as to extend substantially parallel to the slit 10A. The third sheet 40 may be constituted by a film made of a resin such as PE (polyethylene) or PP (polypropylene), or by a foamed product formed from a rubber-like elastic body and made of the same material as the material of the second sheet 20. In such a case, a length of the third sheet 40 in a direction parallel to a long axis of the slit 10A is preferably set longer than a length of the slit 10A along the long axis. This prevents tearing of the second sheet 20 when the wire harness D5 is inserted through the slit 10A.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A door hole seal in accordance with an aspect of the present invention is a door hole seal to be attached to a door inner panel of a door of a vehicle, including: a first sheet configured to close a service hole of the door inner panel, the first sheet having a slit through which a wire harness is inserted; and a second sheet covering the slit from an exterior side of the vehicle in such a manner that the wire harness is allowed to be inserted through the slit, at least a specific region of the second sheet being made of a rubber-like elastic body, the specific region extending from a first portion to a second portion of the second sheet, the first portion corresponding to the slit, the second portion being a vertically lower end.

With the configuration, at least a specific region of the second sheet is made of a rubber-like elastic body, the specific region extending from a first portion to a second portion of the second sheet, the first portion corresponding to the slit, the second portion being a vertically lower end. Accordingly, in comparison with a case where the second sheet is made of a material other than the rubber-like elastic body, the second sheet is less prone to vibrate. This allows for reduction of noise caused by vibration of the second sheet.

Further, a door hole seal in accordance with an aspect of the present invention may be configured such that the second sheet includes an adhesive part provided on one surface of the second sheet and bonded to the first sheet, and the second sheet is bonded to the first sheet by a portion of the adhesive part which portion is provided in at least: an upper portion of the second sheet, the upper portion being located vertically above the slit; and a side portion of the second sheet, the side portion extending, in a position located closer to a front side of the vehicle than the slit and/or in a position located closer to a rear side of the vehicle than the slit, from the upper portion to the vertically lower end.

With the configuration, the second sheet is bonded to the first sheet by the portion of the adhesive part which portion is provided in the upper portion and the side portion. This makes it possible to effectively prevent rainwater or the like from entering the interior side of the vehicle through the slit from above or from a side of the slit.

Further, a door hole seal in accordance with an aspect of the present invention may be configured such that at least a portion of the specific region of the second sheet is folded back such that (i) the adhesive part is on an inner side and (ii) portions of the adhesive part are bonded to each other.

With the configuration, at least a portion of the specific region of the second sheet is folded back such that (i) the adhesive part is on an inner side and (ii) portions of the adhesive part are bonded to each other. As such, a complicated process need not be carried out in order to allow the wire harness to be inserted. Specifically, for example, it is neither necessary to provide an adhesive part only in a portion of the second sheet other than the specific region, nor is it necessary to reduce the adhesiveness of the specific region of the second sheet by aligning the specific region with another member and bonding the specific region and the another member to each other. This makes it possible to easily produce the door hole seal.

Further, a door hole seal in accordance with an aspect of the present invention may be configured such that the second sheet is folded back from a vertically lower side toward the first portion corresponding to the slit. With the configuration, the second sheet is folded back from the vertically lower side toward the first portion corresponding to the slit. Accordingly, the wire harness inserted through the slit is covered by the second sheet in an area closer to the vehicle exterior side than the first sheet. This makes it possible to effectively prevent rainwater or the like from entering through the slit from the vehicle exterior side.

Further, a door hole seal in accordance with an aspect of the present invention may be configured such that the rubber-like elastic body is a foamed product. With the configuration, since the rubber-like elastic body is a foamed product, the second sheet is even less prone to vibrate. This allows for further reduction of noise caused by vibration of the second sheet.

Further, a door hole seal in accordance with an aspect of the present invention may be configured such that the rubber-like elastic body is ethylene-propylene-diene rubber. With the configuration, since the rubber-like elastic body is ethylene-propylene-diene rubber, the second sheet is even less prone to vibrate. This allows for further reduction of noise caused by vibration of the second sheet.

Further, a door hole seal in accordance with an aspect of the present invention may be configured such that the rubber-like elastic body is a thermoplastic elastomer. With the configuration, since the rubber-like elastic body is a thermoplastic elastomer, the second sheet is even less prone to vibrate. This allows for further reduction of noise caused by vibration of the second sheet.

REFERENCE SIGNS LIST

1: door hole seal
10: first sheet
10A: slit
20: second sheet
23: lower end (vertically lower end)
24: specific region
40: third sheet
211: main body-side adhesive part (adhesive part)
213: upper portion
214: front portion (side portion)
215: rear portion (side portion)
221: turnback-side adhesive part (adhesive part)
D3: door inner panel
D3A: service hole
D5: wire harness

What is claimed is:

1. A door hole seal to be attached to a door inner panel of a door of a vehicle, comprising:
   a first sheet configured to close a service hole of the door inner panel, the first sheet having a slit through which a wire harness is inserted; and
   a second sheet covering the slit from an exterior side of the vehicle in such a manner that the wire harness is allowed to be inserted through the slit,
   at least a specific region of the second sheet being made of an elastic body, the specific region extending from a first portion to a second portion of the second sheet, the first portion corresponding to the slit, the second portion being a vertically lower end, the second sheet including an adhesive part provided on one surface of the second sheet and bonded to the first sheet, the second sheet being bonded to the first sheet by a portion of the adhesive part which portion is provided in at least:

an upper portion of the second sheet, the upper portion being located vertically above the slit; and a side portion of the second sheet, the side portion extending, in a position located closer to a front side of the vehicle than the slit and/or in a position located closer to a rear side of the vehicle than the slit, from the upper portion to the vertically lower end, a turnback part, which is at least a portion of the specific region of the second sheet, is folded back such that (i) the adhesive part is on an inner side and (ii) portions of the adhesive part are bonded to each other, a length of a portion of the second sheet other than the turnback part in a front-rear direction being longer than a length of the turnback part in the front-rear direction.

2. The door hole seal as set forth in claim 1, wherein the second sheet is folded back from a vertically lower side toward the first portion corresponding to the slit.

3. The door hole seal as set forth in claim 1, wherein the elastic body is a foamed product.

4. The door hole seal as set forth in claim 1, wherein the elastic body is ethylene-propylene-diene rubber.

5. The door hole seal as set forth in claim 1, wherein the elastic body is a thermoplastic elastomer.

\* \* \* \* \*